United States Patent [19]
Ho

[11] Patent Number: 4,973,397
[45] Date of Patent: * Nov. 27, 1990

[54] HYDROTREATING PROCESS WITH MIXED CATALYSTS

[75] Inventor: Teh C. Ho, Baton Rouge, La.

[73] Assignee: Exxon Research and Engineering Company, Florham Park, N.J.

[*] Notice: The portion of the term of this patent subsequent to Feb. 20, 2007 has been disclaimed.

[21] Appl. No.: 214,996

[22] Filed: Jul. 5, 1988

[51] Int. Cl.$^5$ ............................................. C10G 47/02
[52] U.S. Cl. .............................. 208/112; 208/216 R; 208/217; 502/221
[58] Field of Search ............... 208/57, 58, 112, 216 R, 208/217, 228, 246, 247, 249, 251 H, 254 H; 502/221

[56] References Cited

U.S. PATENT DOCUMENTS

| 4,497,704 | 2/1985 | O'Hara et al. | 208/112 |
| 4,579,649 | 4/1986 | Morales et al. | 208/251 H |
| 4,657,664 | 4/1987 | Evans et al. | 208/112 x |
| 4,698,145 | 10/1987 | Ho et al. | 208/112 X |
| 4,705,619 | 11/1987 | McCandlish et al. | 208/112 |
| 4,820,677 | 4/1989 | Jacobson et al. | 502/221 X |

*Primary Examiner*—Glenn Caldarola
*Assistant Examiner*—William L. Diemler
*Attorney, Agent, or Firm*—Henry E. Naylor

[57] ABSTRACT

Disclosed is a process for hydrotreating a hydrocarbonaceous feed wherein the feed is contacted in a mixed catalyst bed at a temperature of about 200° C. to 450° C., in the presence of hydrogne, which catalyst bed is comprised of: (a0 one or more catalysts comprised of at least one metal selected from Group VIB and at lease one metal selected from Group VIII of the Periodic Table of the Elements, on an inorganic oxide support material; and (b) one or more catlayst represented by $MM'_aS_x$ where M is Cr or one or more divalent promoter metals selected from Mn, Fe, Co, Ni, Cu and Zn; M' is one or both of MO and W; x is 0.5 to 9, and a=1 when Cr is not one of metals represented by M, and $0.5 \leq a \leq 3$ when Cr is one of the metals represented by M.

9 Claims, No Drawings

HYDROTREATING PROCESS WITH MIXED CATALYSTS

FIELD OF THE INVENTION

The present invention relates to a hydrotreating process in where a mixed bed of catalysts are employed. The mixed bed contains two types of catalyst. One type is the conventional supported catalyst while the other type is a sulfide catalyst derived from metal amine molybdates (or tungstates) or metal amine thiomolybdates (or thiotungstates).

BACKGROUND AND PROBLEMS

Hydrotreating of petroleum feedstocks and various boiling fractions thereof has become increasingly important because of more stringent product quality requirements. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking and/or catalytic reforming.

Hydrotreating is well known in the art and usually requires treating a hydrocarbonaceous feed with hydrogen in the presence of a catalyst to effect conversion of at least a portion of the feed to lower boiling products, and/or removal of deleterious components. See for example U.S. Pat. No. 2,914,462 which discloses the use of molybdenum sulfide for hydrodesulfurizing gas oil and U.S. Pat. No. 3,148,135 which discloses the use of molybdenum sulfide for hydro-refining sulfur and nitrogen-containing hydrocarbon oils. Further, U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts, as well as with other types of catalysts, greater catalyst surface areas generally result in more active catalysts than similar catalysts with lower surface areas. Thus, those skilled in the art are constantly trying to achieve catalysts having ever greater surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from about 300°-800° C. in the presence of essentially inert, oxygen-free atmospheres. Suitable atmospheres are disclosed as consisting of argon, a vacuum, nitrogen, and hydrogen. In U.S. Pat. No. 4,243,554, an ammonium thiomolybdate salt is decomposed at a rate in excess of 15° C. per minute, whereas in U.S. Pat. No. 4,243,553, a substituted ammonium thiomolybdate salt is thermally decomposed at substantially slower heating rate of about 0.5 to 2° C./min. The processes disclosed in these patents are claimed to produce molybdenum disulfide catalysts having superior properties for water gas shift and methanation reactions as well as for catalyzed hydrogenation and hydrotreating reactions.

Hydrotreating catalysts comprising molybdenum sulfide, in combination with other metal sulfides, are also known. For example, U.S. Pat. No. 2,891,003 discloses an iron-chromium composition for desulfurizing olefinic gasoline fractions. Further, U.S. Pat. No. 3,116,234 discloses Cr-Mo and also Mo with Fe and/or Cr and/or Ni for hydrodesulfurization. Also U.S. Pat. No. 3,265,615 discloses Cr-Mo for hydrodenitrogenation and hydrodesulfurization.

More recently, new classes of hydrotreating catalysts have been developed which comprise self-promoted molybdenum and/or tungsten sulfide. For example, U.S. Pat. No. 4,663,023, which is incorporated herein by reference, teaches the catalysts represented by the formula $MM'A_x$ where M is one or more promoter metals such as Ni and Co; M' is Mo and/or W; x is a number 1 to 5, and A is oxygen or sulfur. These catalysts are prepared from a precursor represented by $ML(Mo_yW_{1-y}A_4)$ wherein M is one or more promoter metals, L is one or more, neutral, nitrogen-containing ligands at least one of which is a chelating polydenate ligand; and y is any value from 0 to 1, and A is 0 or S. These precursors are also taught in U.S. Pat. No. 4,595,676, which is also incorporated herein by reference. Other precursors and taught in U.S. Pat. Nos. 4,591,429; 4,632,747; and 4,668,376 all of which are incorporated herein by reference. Further, chromium-molybdenum and tungsten sulfide catalysts are taught in U.S. Pat. Nos. 4,622,128; 4,626,339; and 4,716,139, all of which are also incorporated herein by reference.

SUMMARY OF THE INVENTION

In accordance with the present invention there is provided a process for hydrotreating a hydrocarbonaceous feed, which process comprises contacting the feed at a temperature from about 200° C. to about 450° C., in the presence of hydrogen, and a catalyst bed comprised of (a) one or more catalyst comprised of at least one metal selected from Group VIB and at least one metal selected from Group VIII of the Periodic Table of the Elements, on an inorganic oxide support material; and (b) one or more catalyst represented by the formula $MM'_aS_x$ where M is Cr or one or more divalent promoter metals selected from the group consisting of Mn, Fe, Co, Ni, Cu, and Zn; M' is one or both of Mo and W; x is 0.5 to 9, and a=1 when one of the metals represented by M is not Cr or $1 < a \leq 1.5$ when one of the metals represented by M is Cr, wherein said catalyst is derived from a precursor selected from the formula:

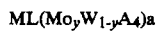

$ML(Mo_yW_{1-y}A_4)_a$ where M is Cr, or one or more divalent promoter metals selected from the group consisting of Mn, Fe, Co, Ni, Cu, and Zn; L is one or more neutral, nitrogen-containing ligands at least one of which is a chelating polydentate ligand; $0 \leq y \leq 1$; A is O or S; and a is as defined above.

The Cr-containing catalysts can also be prepared from a mixture of (1) a hydrated oxide of trivalent chromium and (2) a salt containing a thiometallate anion of Mo or W and a cation comprising at least one divalent promoter metal chelated by at least one neutral, nitrogen-containing polydentate ligand. In this case, a is within the range of $0.5 \leq a \leq 3$ and more preferably within the range of $0.8 \leq a \leq 2$.

DETAILED DESCRIPTION OF THE INVENTION

A variety of feedstocks can be hydrotreated in accordance with the present invention including both hydrocarbon fractions and whole feeds. Non-limiting examples of such feeds include organic solvents, light, middle and heavy distillates, and residual feeds.

In practicing hydrotreating in accordance with the present invention, a sulfur and/or nitrogen containing feedstream is contacted with hydrogen at hydrotreating conditions in a bed of catalyst comprised of one or more catalysts comprised of active metal components and an inorganic refractory support, preferably an inorganic oxide. The active metal component is comprised of at least one metal from Group VIB of the Periodic Table of the Elements and at least one promoter metal, preferably a metal from Group VIII of the Periodic Table of the Elements, on an inorganic oxide support. Preferred Group VIB metals are molybdenum and tungsten. More preferred is molybdenum. Preferred Group VIII metals are selected from cobalt, nickel, and iron. More preferred are cobalt and nickel. The amounts of active metal components range from about 0.5 to 20 wt. %, preferably from about 1 to 8 wt. %, more preferably from about 2 to 5 percent wt. %, in terms of its oxide, based on the total weight of the catalyst for the Group VIII metal, and from about 5 to 30 wt. %, preferably from about 8 to 25 wt. %, and more preferably from about 12 to 20 wt. %, in terms of an oxide, based on the total weight of the catalyst for the Group VIB metal. Support materials suitable for use herein are any conventional support material used in the manufacture of hydrotreating catalysts. Such materials are usually refractory oxides of elements of Groups II to IV of the Periodic Table of the Elements. The Periodic Table to which all of the Groups herein refer to can be found on the last page of *Advanced Inorganic Chemistry*, 2nd Edition, 1966, Interscience Publishers, by Cotton and Wilkenson. Preferred are alumina, silica, and silica-alumina. More preferred is alumina. The alumina may contain up to 5 wt. % of silica or phosphate to stabilize it and/or to give the required pore characteristics. An alumina support means, therefore, one with at least 99 wt. % alumina.

Also present in the catalyst bed is one or more catalysts of a second type represented by the formula $MM'_aS_x$ where M is Cr and/or one or more divalent promoter metals selected from the group consisting of Mn, Fe, Co, Ni, Cu, and Zn; M' is one or both of Mo and W; x is a number from 0.5 to 9 and more preferably from 1 to 5; $a=1$ when Cr is not one of the metals represented by M and $0.5 < a \leq 3$ or more preferably $0.8 \leq a \leq 2$ when Cr is one of the metals represented by M, with or without another promoter metal. The catalysts can be derived from two types of precursors. In one case, the catalyst is derived from a precursor represented by $ML(Mo_yW_{1-y}A_4)a$ where M is as defined above; L is one or more neutral, nitrogen-containing ligands at least one of which is a chelating polydentate ligand; $0 \leq y \leq 1$; A is O or S and a is defined as above.

Preferably, M will be selected from the group consisting of: (a) Ni, Co, Fe and mixtures thereof, and (b) mixtures of (a) with Zn, Cu, Mn, Cr. Still more preferably M will be selected from the group consisting of Fe, Mn, Ni, Co, Cr and mixtures thereof. Thus, the promoter metal may be a single metal such as Ni, in which case the precursor will have the formula $(NiL)(Mo_yW_{1-y}A_4)$. Alternatively the promoter metal may be a mixture of two, three, four, five, or even six promoter metals. For the case of two promoter metals, such as Ni and Co, the precursor will have the formula $[(Ni_bCo_{1-b})L](Mo_yW_{1-y}A_4)$ where $0 < b < 1$, and so on for the case where 3, 4, 5 or 6 promoter metals are present. The precursor may be a self promoted molybdate, thiomolybdate, tungstate, thiotungstate or combination thereof. If it is a molybdate, then y will have a value of 1. Alternatively, if the precursor is tungstate, y will be zero.

In the other case, which is applicable to only the Cr-containing catalysts, the catalyst is derived from a mixture of (i) a hydrated oxide of trivalent chromium and (ii) a thiometallate salt of the general formula $ML(Mo_yW_{1-y}S_4)$ wherein M is one or more divalent promoter metals selected from the group consisting of Ni, Co, Mn, Cu, Zn mixtures thereof, and mixtures thereof with Fe, wherein y is any value ranging from 0 to 1 and L is one or more neutral, nitrogen-containing ligands at least one of which is a chelating polydentate ligand. The total denticity of the ligands used to form the precursor compound will be about six.

If desired, more molybdenum and/or tungsten sulfide may be incorporated into the precursor, and concomitantly the composition of this invention, by also including in the precursor mixture a thiometallate salt of the general formula $(L')(Mo_yW_{1-y}S_4)$ wherein y is as above and L' is the conjugate acid of one or more ligands, L, with a charge sufficient to balance the dinegative charge of the thiometallate anion. In such a case the precursor will comprise a mixture of (i) a hydrated oxide of trivalent chromium, (ii) a thiometallate salt containing the desired divalent promoter metal of the formula $ML(Mo_yW_{1-y}S_4)$ and (iii) a thiometallate salt of the formula $(L')(Mo_yW_{1-y}S_4)$.

The ligand L, will generally have a denticity of six and will be one or more neutral, nitrogen-containing ligands wherein at least one of said ligands is a multidentate chelating ligand which chelates the promoter metal to form a chelated promoter metal cation $[ML]^{2+}$. Thus, the catalytic metal oxide anion $(Mo_yW_{1-y}A)^{2-}$ will be ionically bound to the chelated promoter metal cation $[ML]^{2+}$. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydenate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably, L will be one or more polydentate chelating ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate ligands. In general, the ligands useful in this invention include alkyl and aryl amines and nitrogen heterocycles. Illustrative, but non-limiting examples of ligands useful in the catalyst precursors of this invention are set forth below.

Monodentate ligands will include $NH_3$, as well as alkyl and aryl amines such as ethyl amine, dimethyl amines, pyridine, etc. Useful chelating bidenate amine ligands are illustrated by ethylenediamine, 2,2'-bipyridine, 1,10-phenylene bis(dimethyl-amine), o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating guadradentate amine ligand. Useful chelating pentadentate ligands include tetraethylenepenetamine while sepulchrate (an octazacryptate) is illustrative of a suitable chelating hexadentate ligand. However, as a practical matter it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine and diethylenetriamine.

In general, the precursor salts useful for forming the catalysts of this invention and which are represented by the aforementioned formula when M is not Cr, may be prepared by mixing an aqueous solution of ammonium molybdate and/or tungstate for A=oxygen and ammonium thiomolybdate and/or thiotungstate for A=sulfur, with an aqueous solution of chelated promoter metal cation, for example, $[ML]^{2+}$ which, in the presence of excess metallate (A=O), or thiometalate (A=S), ligand and/or chelated promoter metal cation, will result in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use. Non-limiting examples of such salts include halides, sulfates, prechlorates, acetates, nitrates, etc. Alternatively, an aqueous solution of ammonium molybdate and/or tungstate, or ammonium thiomolybdate and/or thiotungstate may be mixed with the ligand with the resulting solution mixed with an aqueous solution of promoter metal salt. The salt can also be added to the ligand and dissolved into the solution of molybdate and/or tungstate or thiomolybdate and/or thiotungstate, as the case may be. It should be understood that the catalyst precursor preparation is not intended to be limited to aqueous media.

When the composition of the present invention can contain chromium, two different procedures can be used for the precursor preparation. In one procedure, the chromium containing precursor is prepared by mixing a slurry of (i) a hydrated oxide of trivalent chromium $Cr(OH)_3 \cdot xH_2O$ with (ii) one or more of the promoter metal and ligand containing thiometallate salts and, optionally, (iii) one or more thiometallate salts of Mo and/or W containing the conjugate acid of one or more ligands, but no divalent promoter metal. The thiometallate salt is then precipitated onto the slurried particles of hydrated chromium oxide and the precursor is recovered. The hydrated chromium oxide may be freshly precipitated from an aqueous solution of a trivalent chromium salt. Alternatively, the source of hydrated chromic oxide may be a colloidal, aqueous suspension of same. In one method of preparation the hydrated chromium oxide will be precipitated from an aqueous solution of trivalent chromium salt by contacting said salt solution with one or more basic amine chelating agents.

In one embodiment, a water soluble trivalent chromium compound and divalent metal salt are dissolved in water and hydrated chromium oxide is precipitated by addition of a ligand, L, or a mixture of ligands, L. This procedure produces a slurry or suspension of very fine particles of a hydrated oxide of trivalent chromium in the aqueous phase, which also contains some free ligand L, and some of the conjugate acid of the ligand L, L'. When the conjugate acid is a strong acid, that is, if the ligand L is a weak base, then a quantity of ammonium hydroxide may be added to precipitate the chromium. The water soluble chromium salt may be any water soluble salt that is convenient to use such as halide, sulfate, nitrate, etc. Sufficient ligand L is added to form the water soluble chelated promoter metal cations $[ML]^{2+}$. This suspension of hydrated chromium oxide containing $[ML]^{2+}$ in solution is then mixed with a solution of the thiometallate prepared by dissolving ammonium thiometallate in an excess of the ligand or mixture of ligands. A small amount of water may be added if desired. On mixing the slurry with the thiometallate solution, an orange-red colored precipitate of the catalyst precursor forms which is recovered by filtration. This precipitate will be a precursor of a composition of this invention. Any step of this preparation may be done in the presence of a slurry of support material. If the chromia is present in sufficient amount, then the excess will serve as all or a portion of the support.

In another embodiment the thiometallate salts $ML(Mo_yW_{1-y}S_4)$ and $(L')(Mo_yW_{1-y}S_4)$ may be prepared separately and mixed separately or together with the hydrated chromium oxide slurry prepared as described above. Again, this may be done in the presence of a slurry of support material. If the chromia is present in sufficient amount, then the excess chromia will comprise all or a portion of the support.

The salts $(L')(Mo_yW_{1-y}S_4)$ may generally be prepared by dissolving the ammonium thiometallate in excess of the ligand L. The salt is recovered as a precipitate by addition of water or some other suitable antisolvent such as methanol or acetone. If desired, these salts may be formed in the presence of one or more precursor materials as well as in the presence of one or more support materials. This procedure and precursor have more fully been discussed in U.S. Pat. No. 4,622,128 which is incorporated herein by reference.

The chromium-containing precursor compositions can also be prepared by mixing a solution of an appropriate thiometallate such as ammonium thiomolybdate and/or thiotungstate in a mixture of ligand(s) L and water with an aqueous solution of the chelated promoter metal cation, containing trivalent chromium $[Cr_{1-z}M_zLX_y]^{2n+}$, which results in the formation of the precursor compound as a precipitate which is readily recovered. The chelated, trivalent chromium containing cation is formed under anhydrous conditions by dissolving a soluble salt of trivalent chromium, such as CrCl₃, in an appropriate ligand or ligand mixture at low temperature (i.e., 0° C.). When this solution is warmed up to ambient temperature, the chelating reaction occurs and the chelated salt precipitates. The product can be filtered, washed with methanol and dried for subsequent use. The chelated divalent metal promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. While the chelated salts are generally water soluble, they can be precipitated from their aqueous solutions by the addition of methanol, filtered and washed with methanol, and dried. For example, solid Ni(en)$_3$Cl$_2$ can be prepared by adding ethylenediamine (en) to an aqueous solution of NiCl$_2$·6H$_2$O, adding methanol to precipitate the chelate, washing with methanol and drying.

The anhydrously prepared chelated chromium cation salt is dissolved in water along with the chelated divalent promoter salt. The ammonium thiometallate solution is mixed with this solution containing the chelated promoters, resulting in the precipitation of the catalyst precursor. This procedure and precursor are more fully discussed in U.S. Pat. No. 4,716,139 which is incorporated herein by reference.

The difference in the method of preparing the chelated chromium promoter cation from the chelated divalent metal promoter cations is the fact that chromium chelation is slow compared to that of the divalent ions. As a result, the addition of the basic ligand to an aqueous chromium salt solution will result in the formation predominantly of hydrated chromium oxide instead of the chelate (CrL)Cl$_3$. To avoid this hydrated oxide formation, the chromium chelation is carried out under anhydrous conditions by adding the trivalent chromium salt to the dry ligand. One can prepare the divalent promoter metal chelates in the same manner, either separately or along with the trivalent chromium chelates.

The catalysts of this second type may be used in bulk or they can be on a suitable support. It is preferred that they be dispersed on an inorganic oxide such as alumina. As previously stated, an advantage of the catalyst precursors where A=oxygen resides in their water solubility which permits them to be supported on suitable support materials by techniques well-known in the art, such as impregnation, incipient wetness, and the like. The choice is left to the convenience of the practitioner. When using the impregnation technique, the aqueous impregnating solution will be contacted with the support for a time sufficient to deposit the precursor material onto the support either by selective adsorption or alternatively, the excess water may be evaporated during drying, leaving behind the precursor salt. Advantageously, an incipient wetness technique may be used whereby just enough of an aqueous precursor salt solution is added to dampen and fill the pores of the support.

Where A=S and it is desired that the catalyst contains a support material, the precursor salt preparation may be done in the presence of a slurry of support material, in which case the precursor salt will be formed or precipitated onto the surface of the support material. Alternatively, the precursor salt or salts may be prepared and then composited with support material to form the catalyst precursor composite.

Prior to use, the catalysts of this second type are presulfided by heating one or more catalyst precursor salts, bulk or supported, in the presence of sulfur in a non-oxidizing atmosphere, at a temperature of at least about 200° for a time sufficient to form the catalyst. Preferably, the sulfur required during the formation of the catalyst will be present in the form of a sulfur bearing compound and in an amount in excess of that required to form the catalyst. Thus, it is preferred that the catalyst be formed by heating the precursor in the presence of sulfur or, preferably in the presence of a sulfur bearing compound which can be one or more solids, liquids, gases or mixtures thereof. Mixtures of hydrogen and H$_2$S have been found to be particularly preferred. Preferably, the temperature will range between from about 250–600° C., more preferably from about 250–500° C. and still more preferably from about 300–450° C. The non-oxidizing atmosphere may be inert or net reducing.

As discussed above, molybdenum and tungsten sulfide catalysts have many uses, including hydrotreating. Hydrotreating conditions vary considerably depending on the nature of the hydrocarbon being hydrotreated, the nature of the impurities or contaminants to be reacted or removed, and, inter alia, the extent of conversion desired, if any. In general, however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feel boiling within a range of from about 290–500° C., or residuum containing from about 10 percent to about 50 percent of material boiling above about 575° C.

| Feed | Temp., ° C. | Pressure psig | Space Velocity V/V/Hr. | Hydrogen Gas Rate SCF/B |
|---|---|---|---|---|
| Naphtha | 100–370 | 150–800 | 0.5–10 | 100–2000 |
| Diesel | 200–400 | 250–1500 | 0.5–6 | 500–6000 |
| Heavy | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

The following examples are presented to illustrate the invention.

Feedstock

The feedstock used in the following examples was a light catalytic cycle oil (LCCO), the properties of which is set forth in Table 1 below.

TABLE I

| API Gravity at 60° F. | 16.5 |
|---|---|
| Sulfur, Wt. % | 1.35 |
| Nitrogen, WPPM | 715 |

Equipment/Procedure

The evaluation experiments were conducted in a fixed-bed reactor immersed in a sand bath. The reactor was packed with about 10 cc of catalyst(s) in the central zone and denstone in the fore and aft zones. To ensure an adequate reactor-to-particle diameter ratio, the catalysts were crushed into 14/35 mesh granules. To obtain the lined-out activity, the reaction under a particular set of conditions was allowed to proceed for at least 24 hours before the first product sample was analyzed. The liquid product was analyzed for total sulfur by X-ray fluorescence and for nitrogen by combustion analysis. Test conditions were 330 psig, 625° F., 1500 SCF/B $H_2$, and 1.0 LHSV.

Data Analysis/Results

The following mass balance equation for a second-order reaction occurring in a plug-flow reactor is used to determine volumetric rate constant for HDS, $K_{HDS}$.

$$K_{HDS} = LHSV\left(\frac{1}{S_p} - \frac{1}{S_f}\right)$$

wherein $S_f$ and $S_p$ are the wt. % of sulfur in the feed and product, respectively.

The HDN rate constant, $K_{HDN}$, is determined based on first-order kinetics; that is, $$K_{HDN} = LHSV \ln \frac{N_f}{N_p}$$

wherein $N_f$ and $N_p$ are the wppm of nitrogen in the feed and product, respectively.

In all of these experiments, the results obtained from the catalysts of this invention were compared to results obtained from a commercial hydrotreating catalyst designated as KF-742 (available from Ketjen). Its composition is: Mo wt. %=11.6 and Co wt. %=3.01, both on an elemental metal basis. This catalyst is supported on $\gamma$-$Al_2O_3$ and has a BET surface area of 225 $m^2$/g and a pore volume of 0.44 cc/g.

Catalyst Sulfiding

The catalysts prepared from metal amine metallate precursors were sulfided ex situ in a fixed-bed reactor. Typically, the sulfiding is carried out as follows: The catalyst was heated under flowing nitrogen for one hour to 370° C., held at 370° C. for one hour, then sulfided with a flowing 10% $H_2S$-in-$H_2$ gas mixture for 10 minutes to 400° C. and held at 400° C. for two hours. This was followed by cooling the reactor under $H_2S/H_2$ to 100° C. The flow of $H_2S/H_2$ was then terminated and nitrogen was introduced to flush out any remaining $H_2S/H_2$. The reactor was allowed to cool down to room temperature.

The catalysts prepared from metal amine thiometallate precursors were typically sulfided as follows: The catalyst were loaded in a fixed bed reactor. The reactor was then purged with nitrogen at 100° C. for one hour. A 10% $H_2S$-in-$H_2$ gas mixture was then introduced to the reactor and the reactor was heated to 325° C. and held at this temperature for three hours. The reactor was then cooled to 100° C. at which point the $H_2S/H_2$ flow was terminated and nitrogen was introduced. The catalyst was discharged from the reactor once the reactor was cooled down to room temperature.

The commercial catalyst was sulfided as follows: The catalyst was charged in a fixed bed reactor which was heated under nitrogen to 100° C. and held at 100° C. for one hour. A 10% $H_2S$-in-$H_2$ gas mixture was then introduced. The reactor temperature was raised to 350° C. and held at 350° C. for one hour. Subsequently, the reactor was cooled down to 100° C. and the flowing gas was switched from $H_2S/H_2$ to $N_2$. The cooling was continued under $N_2$ until room temperature was reached.

EXAMPLE 1

The catalysts used in these examples were commercial KF-742 and bulk NiMnMo sulfide prepared from $Ni_{0.5}Mn_{0.5}(en)_3MoO_4$. The mixed bed, in which the two catalysts at an equal volume were uniformly mixed throughout the bed, was compared against single catalyst bed containing only the KF-742 or bulk NiMnMo catalyst. The results are set forth in Table 2 below:

TABLE 2

| Comparison Between Mixed and Single Catalyst Beds | | |
|---|---|---|
| Catalyst Bed | $k_{HDN}$ | $k_{HDS}$ |
| Mixed Bed | 0.5 | 7.7 |
| KF-742 | 0.33 | 7.8 |
| NiMnMo | 0.48 | 4.3 |
| Weighted Sum of KF-742 and NiMnMo | 0.41 | 6.1 |

As seen, the mixed bed outperforms the weighted sum of the two single-catalyst beds, indicating an activity synergy in the mixed bed.

EXAMPLE 2

The mixed bed can also be made of catalyst particles, each of which is a composite of the constituent catalysts. The composite catalysts were made by pelletizing a powder mixture comprising KF-742 and bulk NiMnMo sulfide at a 50/50 volume ratio. The results of the activity tests are shown in Table 3.

TABLE 3

| Comparison Between Mixed and Single Catalyst Beds | | |
|---|---|---|
| Catalyst Bed | $k_{HDN}$ | $k_{HDS}$ |
| Mixed Bed | 0.63 | 7.9 |
| KF-742 | 0.33 | 7.8 |
| NiMnMo | 0.48 | 4.3 |
| Weighted Sum of KF-742 and NiMnMo | 0.41 | 6.1 |

Again, this mixed bed gives rise an unexpected activity synergy. The extent of this synergy is greater than that observed in Example 1.

What is claimed is:

1. A process for hydrotreating a hydrocarbonaceous feed, which process comprises contacting the feed at a temperature from about 200° C. to about 450° C., in the presence of hydrogen, and in a mixed catalyst bed containing two distinct types of catalysts, wherein one type is one or more catalysts comprised of at least one metal selected from Group VIB and at least one metal selected from Group VIII of the Periodic Table of the Elements, on an inorganic oxide support material; and the other type of catalyst is comprised of one or more catalysts represented by the formula MM'S, where M is Cr or one or more divalent promoter metals selected from the group consisting of Mn, Fe, Co, Ni, Cu, and Zn; M' is one or both of Mo and W; x is 0.59 to 9, and a=1 when one of metals represented by M is not Cr or $1 < a \leq 1.5$ when one of the metals represented by M is Cr, wherein said catalyst is derived from a precursor selected from the formula:

$$ML(Mo_yW_{1-y}A_4)_a$$

where M is Cr, or one or more divalent promoter metals selected from the group consisting of Mn, Fe, Co, Ni, Cu, and Zn; L is one or more neutral, nitrogen-containing ligands at least one of which is a chelating polydenate ligand; $0 \leq y \leq 1$; A is O or S; and a is as defined above, wherein the two distinct types of catalysts do not share the same support particle.

2. The process of claim 1 wherein the Group VIB metal is Mo, the Group VIII metal is one or both of Co and Ni, and the support material is alumina.

3. The process of claim 2 wherein M is selected from the group consisting of (a) Fe, Ni, Co and mixtures thereof and (b) mixtures of (a) with Zn, Cu, Mn and mixtures thereof.

4. The process of claim 3 wherein the catalyst represented by the formula MM'S is supported on a material selected from $Al_2O_3$, $SiO_2$, $Cr_2O_3$, and mixtures thereof.

5. The process of claim 4 wherein said chromium oxide support is dispersed on a refractory inorganic support material.

6. The process of claim 3 wherein ligand L is selected from the group consisting of alkylamines, aryl amines, nitrogen heterocycles and mixtures thereof.

7. The process of claim 4 wherein ligand L has a total denticity of six.

8. The process of claim 5 wherein ligand L is two or three bidentate ligands.

9. The process of claim 6 wherein said tridentate and bidentate ligands are diethylenetriamine and ethylendiamine, respectively.

* * * * *